United States Patent
Chen

(10) Patent No.: US 7,894,215 B2
(45) Date of Patent: Feb. 22, 2011

(54) ELECTRONIC APPARATUS, AC/DC CONVERSION DEVICE AND POWER FACTOR CORRECTION CIRCUIT THEREOF

(75) Inventor: Chi-Jen Chen, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 575 days.

(21) Appl. No.: 11/890,500

(22) Filed: Aug. 7, 2007

(65) Prior Publication Data

US 2008/0049464 A1   Feb. 28, 2008

(30) Foreign Application Priority Data

Aug. 23, 2006  (TW) .............................. 95131034 A

(51) Int. Cl.
*H02M 3/335* (2006.01)
(52) U.S. Cl. ................................. 363/21.12; 363/21.14
(58) Field of Classification Search .............. 363/21.01, 363/21.04, 21.12, 21.14, 39, 41, 44, 95, 97, 363/131; 331/78; 349/5
See application file for complete search history.

(56) References Cited

U.S. PATENT DOCUMENTS

| | | | |
|---|---|---|---|
| RE35,402 E * | 12/1996 | Schilling | .................... 375/143 |
| 5,734,562 A | 3/1998 | Redl | |
| 5,838,181 A | 11/1998 | Hesterman | |
| 5,923,152 A | 7/1999 | Guerrera | |
| 6,028,776 A | 2/2000 | Ji et al. | |
| 6,344,986 B1 * | 2/2002 | Jain et al. | ...................... 363/89 |
| 6,621,238 B2 | 9/2003 | Nerone et al. | |
| 6,895,046 B1 * | 5/2005 | Willis et al. | .................. 375/238 |
| 7,012,818 B2 * | 3/2006 | Kotsuji et al. | ............. 363/21.01 |
| 7,088,081 B2 | 8/2006 | Takahashi et al. | |
| 7,423,494 B1 * | 9/2008 | Xin-LeBlanc | ................ 331/78 |
| 2004/0090802 A1 * | 5/2004 | Pourseyed et al. | ............. 363/39 |
| 2004/0120163 A1 * | 6/2004 | Nakagawa | .................... 363/20 |
| 2005/0013143 A1 * | 1/2005 | Kim et al. | ...................... 363/20 |
| 2006/0119617 A1 * | 6/2006 | Toyooka et al. | ............. 345/619 |

FOREIGN PATENT DOCUMENTS

| | | |
|---|---|---|
| CN | 1641958 | 7/2005 |
| TW | 563959 Y | 11/2003 |
| TW | I259642 | 8/2006 |

* cited by examiner

*Primary Examiner*—Adolf Berhane
*Assistant Examiner*—Emily Pham

(57) ABSTRACT

An electronic apparatus, AC/DC conversion device and power factor correction circuit are provided. The power factor correction circuit includes an inductance, a switch, a power control chip, a first diode and a first capacitor. The inductance has a first end and a second end. The first end receives a first voltage. The switch has one end coupled to the second end of the inductance and has the other end coupled to a low voltage. The power control chip receives a spread spectrum synchronization signal, and controls turning on/off of the switch by a control signal according to the spread spectrum synchronization signal. The first diode has an anode coupled to the second end of the inductance. The first capacitor has one end coupled to a cathode of the first diode for generating a second voltage and has the other end coupled to the low voltage.

15 Claims, 6 Drawing Sheets

ELECTRONIC APPARATUS, AC/DC CONVERSION DEVICE AND POWER FACTOR CORRECTION CIRCUIT THEREOF

This application claims the benefit of Taiwan application Serial No. 95131034, filed Aug. 23, 2006, the subject matter of which is incorporated herein by reference.

BACKGROUND OF THE INVENTION

1. Field of the Invention

The invention relates in general to an electronic apparatus, AC/DC conversion device and power factor correction (PFC) circuit thereof, and more particularly to an electronic apparatus, AC/DC conversion device and power factor correction circuit thereof, which can reduce electromagnetic interference (EMI) by using a spread spectrum signal.

2. Description of the Related Art

Referring to FIG. 1, a block diagram of a conventional projector is shown. A projector 100 includes a power factor correction circuit 110, a flyback converter 120, a lighting circuit 130 and a lamp 140. The power factor correction circuit 110 is a power supply for the projector 100. The power factor correction circuit 110 supplies a high DC voltage about 380V to the lighting circuit 130 and the flyback converter 120. The lighting circuit 130 is, for example, a ballast for lighting up the lamp 140. The flyback converter 120 supplies a DC power of 12V, 5V and 3.3V, for example.

However, there usually occurs electromagnetic interference between electronic apparatuses. Therefore, intensity of the electromagnetic waves generated by the electronic apparatuses should be suitably limited. For example, American federal communication commission (FCC) sets up a standard for limiting radiation quantity of electronic products. However, the issue that the power factor correction circuit easily causes electromagnetic interference to other electronic apparatus is still not resolved.

SUMMARY OF THE INVENTION

The invention is directed to an electronic apparatus, AC/DC conversion device and power factor correction circuit thereof. A spread spectrum signal is provided to the power factor correction circuit to reduce the electromagnetic interference.

According to a first aspect of the present invention, a power factor correction (PFC) circuit is provided. The power factor correction circuit comprises a switch and a power control chip. The power control chip is for receiving a spread spectrum synchronization signal, wherein the power control chip controls the switch by a control signal according to frequency of the spread spectrum synchronization signal.

According to a second aspect of the present invention, an AC/DC conversion device is provided. The AC/DC conversion device comprises a power factor correction circuit and a flyback converter. The power factor correction circuit comprises a switch and a power control chip. The power control chip is for receiving a spread spectrum synchronization signal, wherein the power control chip controls the switch by a control signal according to frequency of the spread spectrum synchronization signal. The flyback converter is for receiving a second voltage and accordingly generating an output voltage and outputting the spread spectrum synchronization signal.

According to a third aspect of the present invention, an electronic apparatus is provided. The electronic apparatus comprises a power factor correction circuit, a flyback converter, and a display module. The power factor correction circuit comprises a switch and a power control chip. The power control chip is for receiving a spread spectrum synchronization signal, wherein the power control chip controls the switch by a control signal according to frequency of the spread spectrum synchronization signal. The flyback converter is for receiving the second voltage for generating an output voltage and outputting the spread spectrum synchronization signal. The display module operates according to the output voltage.

The invention will become apparent from the following detailed description of the preferred but non-limiting embodiments. The following description is made with reference to the accompanying drawings.

DETAILED DESCRIPTION OF THE INVENTION

Figure 1:
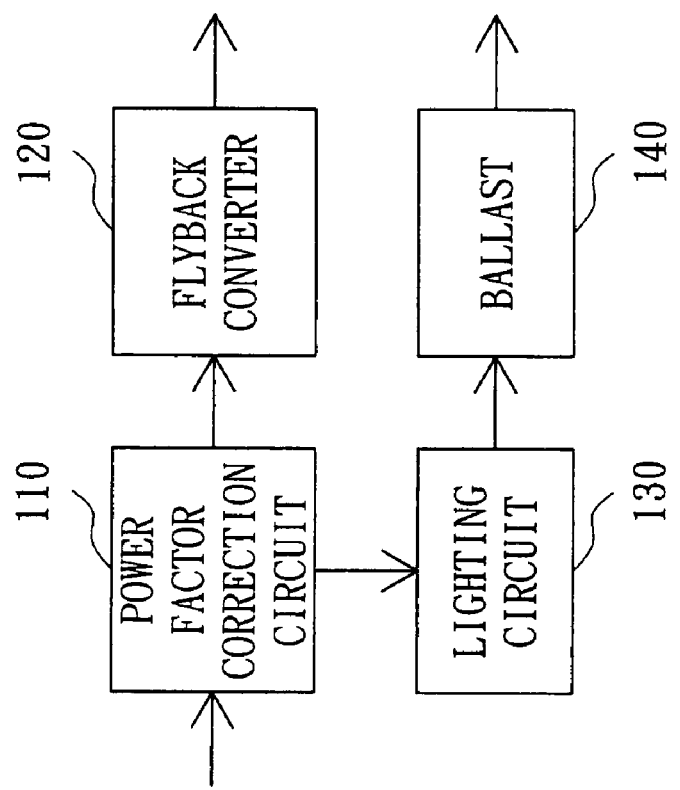
FIG. 1 (Prior Art) is a block diagram of a conventional projector.
Figure 2:
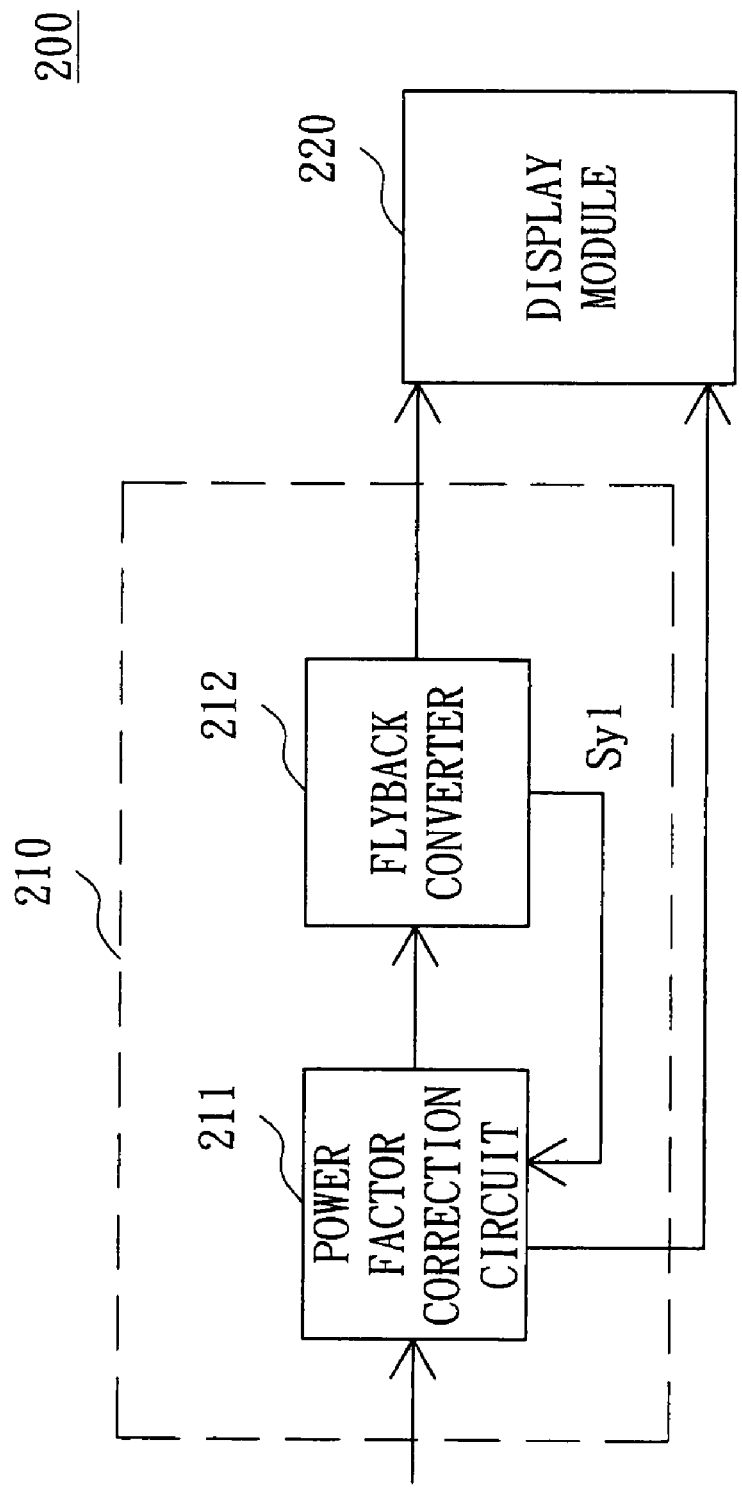
FIG. 2 is a block diagram of an electronic apparatus according to a preferred embodiment of the invention.

Referring to FIG. 2, a block diagram of an electronic apparatus according to a preferred embodiment of the invention is shown. An electronic apparatus 200 includes an AC/DC conversion device 210 and an electrical module, such as a display module 220 as the electronic apparatus 200 is a liquid crystal display. The AC/DC conversion device 210 includes a power factor correction circuit 211 and flyback converter 212. The power factor correction circuit 211 supplies, such as, a high DC voltage about 380V to the display module 220 and the flyback converter 212. The flyback converter 212 supplies a DC power, such as 12V, 5V and 3.3V. The electronic apparatus 200 is, such as, a liquid crystal display or a projector. When the electronic apparatus is a projector, the electrical module is a spatial light modulation module.

The power factor correction circuit 211 receives a spread spectrum synchronization signal Sy1 for reducing its electromagnetic interference. In the embodiment, the spread spectrum synchronization signal Sy1 is provided by the flyback converter 212.

The application of the principle of spread spectrum enables a clock signal operating at a constant frequency to have regular fluctuations within a specific range of the constant frequency in order to generate a frequency waveform similar to a triangular wave. Therefore, the energy originally accumulated at a frequency point can be scattered over a frequency band surrounding the frequency point such that the radiation energy at the frequency point will not exceed a standard value.

Figure 3:
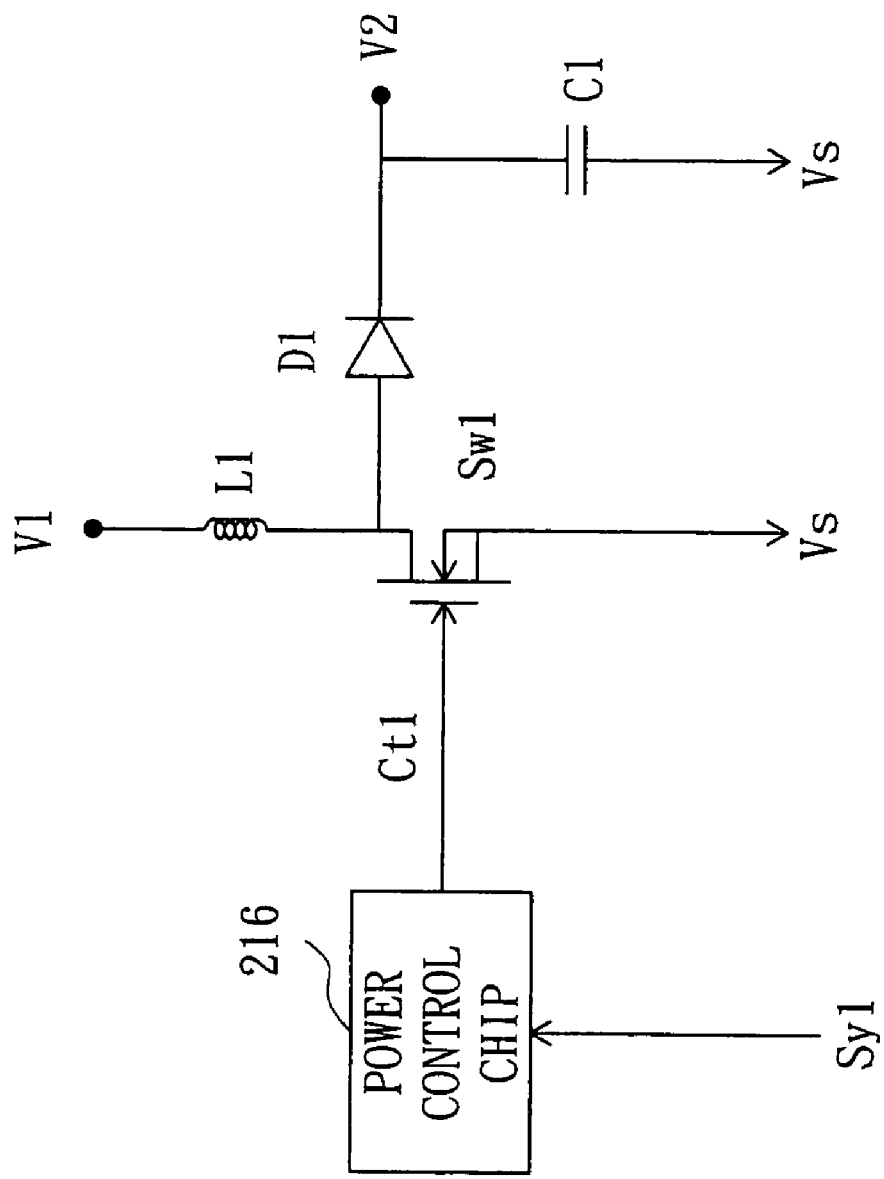
FIG. 3 is a circuit diagram of a power factor correction circuit according to the invention.

Referring to FIG. 3, a circuit diagram of a power factor correction circuit according to the invention is shown. The power factor correction circuit 211 includes an inductance L1, a switch SW1, a power control chip 216, a first diode D1 and a first capacitor C1. The inductance L1 has a first end and a second end. The first end is for receiving a first voltage V1. The switch SW1 has one end coupled to the second end of the inductance L1 and has the other end coupled to a low voltage Vs, such as a ground voltage. The power control chip 216 is for receiving the spread spectrum synchronization signal Sy1 and accordingly controlling the switch SW1 to be turned on/off by using a control signal Ct1 in order to improve the power factor. The first diode D1 has an anode coupled to the second end of the inductance L1. The first capacitor C1 has one end coupled to a cathode of the first diode D1 for generating a second voltage V2 and has the other end coupled to the low voltage Vs. The switch SW1 is, such as, a metal oxide semiconductor field effect transistor (MOSFET) with a gate for receiving the control signal Ct1, a drain coupled to the second end of the inductance L1, and a source coupled to the low voltage Vs.

Figure 4:
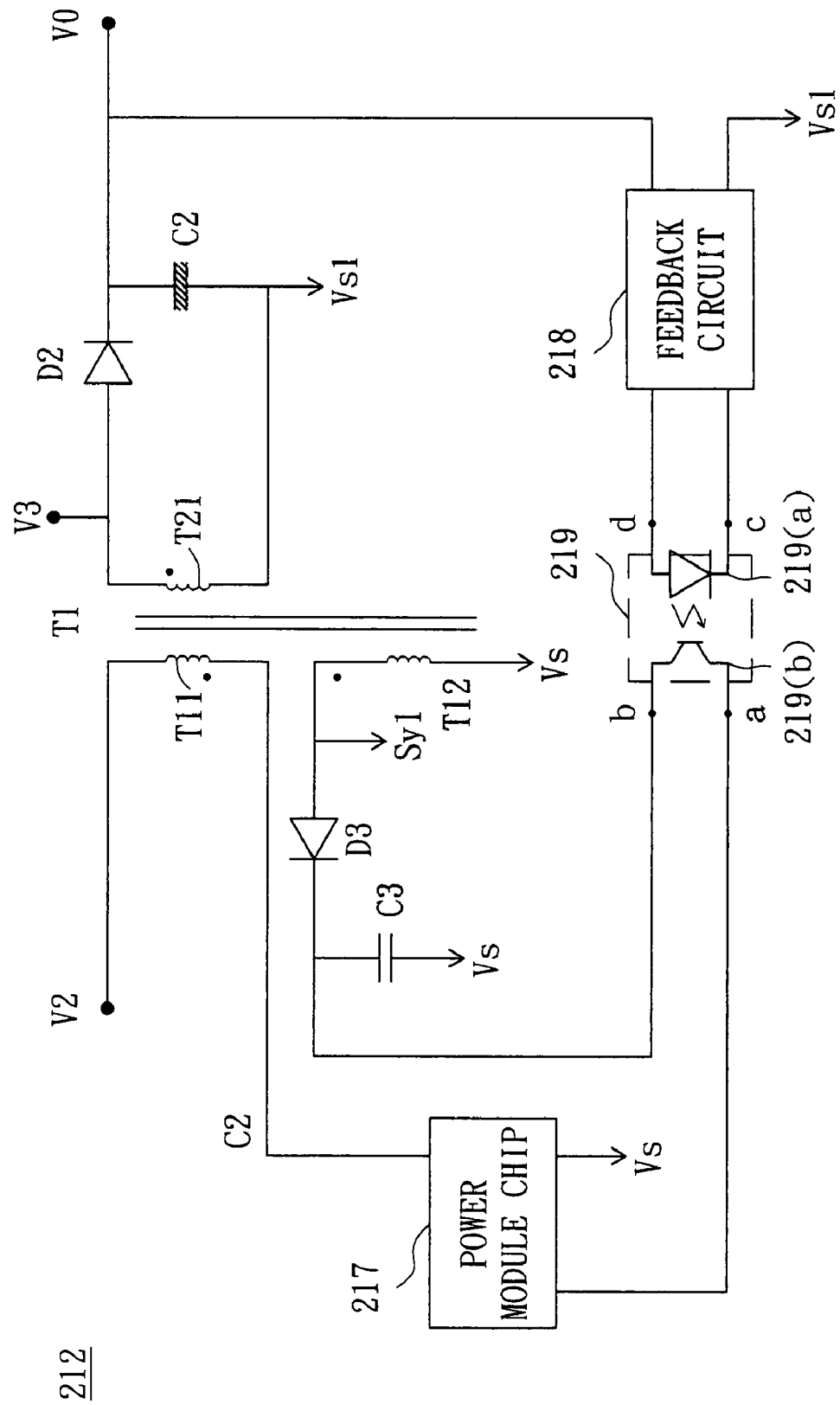
FIG. 4 is a circuit diagram of a flyback converter according to a first example of the invention.

Referring to FIG. 4, a circuit diagram of a flyback converter according to a first example of the invention is shown. The flyback converter 212 includes a power module chip 217, a transformer T1, a second diode D2, and a second capacitor C2. The transformer T1 includes a first primary coil T11, a secondary coil T21 and a second primary coil T12. The first primary coil T11 has one end for receiving the second voltage V2 and has the other end for receiving a control signal C2 of the power module chip 217. The secondary coil T21 generates a third voltage V3 according to the second voltage V2. The second primary coil T12 generates a fourth voltage, that is, the spread spectrum synchronization signal Syl, according to the second voltage V2.

The second diode D2 has an anode coupled to one end of the secondary coil T21 while the other end of the secondary coil T21 is coupled to the low voltage Vs1. The second capacitor C2 has one end coupled to a cathode of the second diode D2 for generating an output voltage Vo and has the other end coupled to the low voltage Vs1. The display module 220 operates according to the output voltage Vo.

The flyback converter 212 further includes a feedback circuit 218, a photo-coupler 219, a third diode D3 and a third capacitor C3. The second primary coil T12 has one end coupled to an anode of the third diode D3 and has the other end coupled to the low voltage Vs.

The photo-coupler 219 includes a light emitting device 219(a), such as a light emitting diode (LED), and a light receiving device 219(b), such as a photo-transistor.

The third capacitor C3 has one end coupled to a cathode of the third diode D3 and one end b of the light receiving device 219(b) and has the other end coupled to the low voltage Vs. The feedback circuit 218 is coupled to the output voltage Vo and a low voltage Vs1, and coupled to the ends d and c of the light emitting device 219(a). The light receiving device 219(b) has one end a for providing a reference signal to the power module chip 217.

Figure 5:
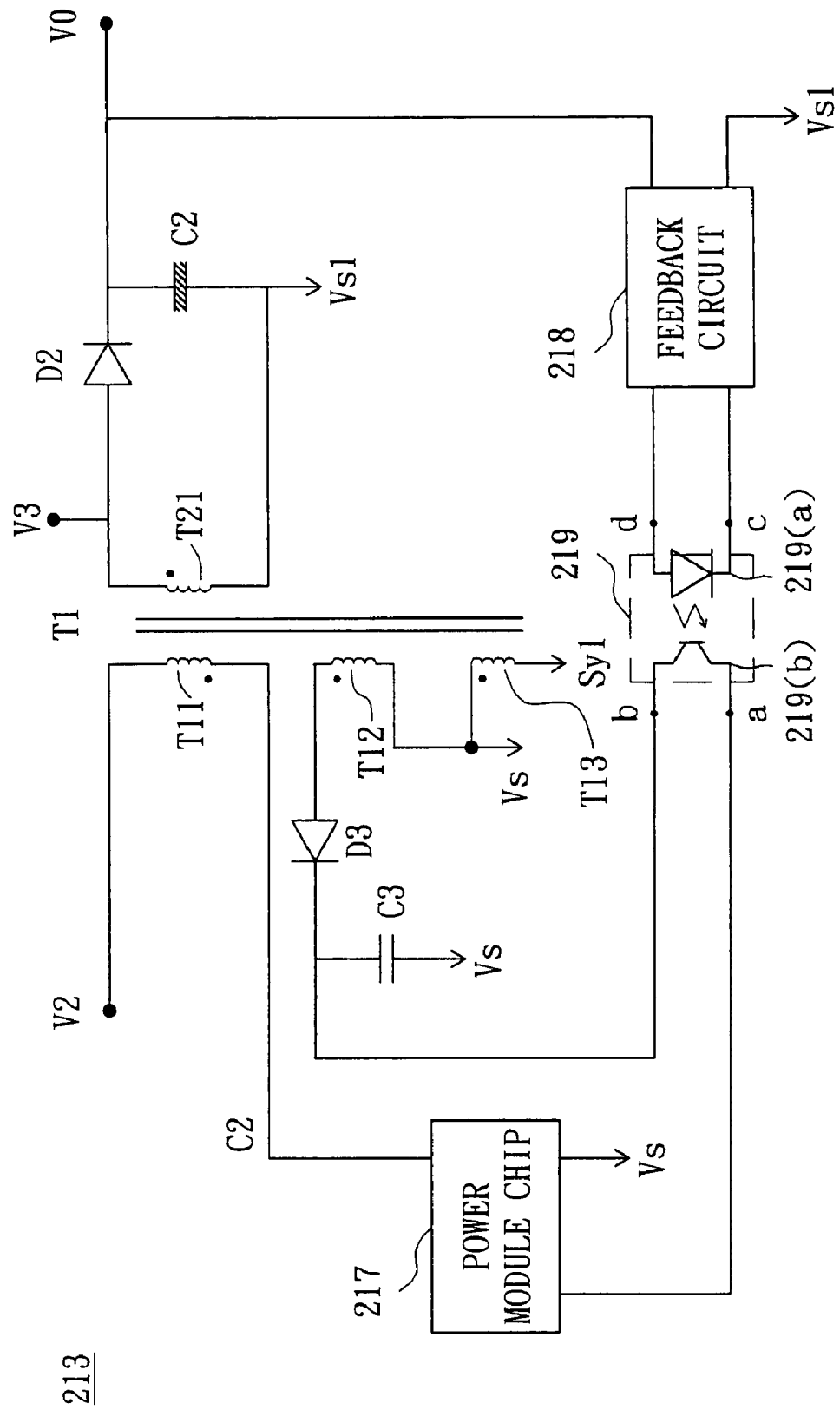
FIG. 5 is a circuit diagram of a flyback converter according to a second example of the invention.

Referring to FIG. 5, a circuit diagram of a flyback converter according to a second example of the invention is shown. Unlike the flyback converter 212 of the first example, the flyback converter 213 of the second example further includes an auxiliary coil T13, wherein the auxiliary coil T13 has one end coupled to the one end of the second primary coil T12 being coupled to the low voltage Vs and has the other end for generating the spread spectrum synchronization signal Sy1. Moreover, the spread spectrum synchronization signals respectively generated by the flyback converters 213 and 212 have a phase difference of 180 degrees. The flyback converter 212 of FIG. 2 can also be replaced by the flyback converter 213 to achieve the same effect.

Therefore, when the flyback converter 213 or 212 uses spread spectrum signals, the power factor correction circuit 211 also can achieve a spread spectrum effect. For example, if the frequency of the flyback converter 213 or 212 is 66 KHz, the power factor correction 211 can also be synchronized to have a frequency 66 KHz.

Figure 6:
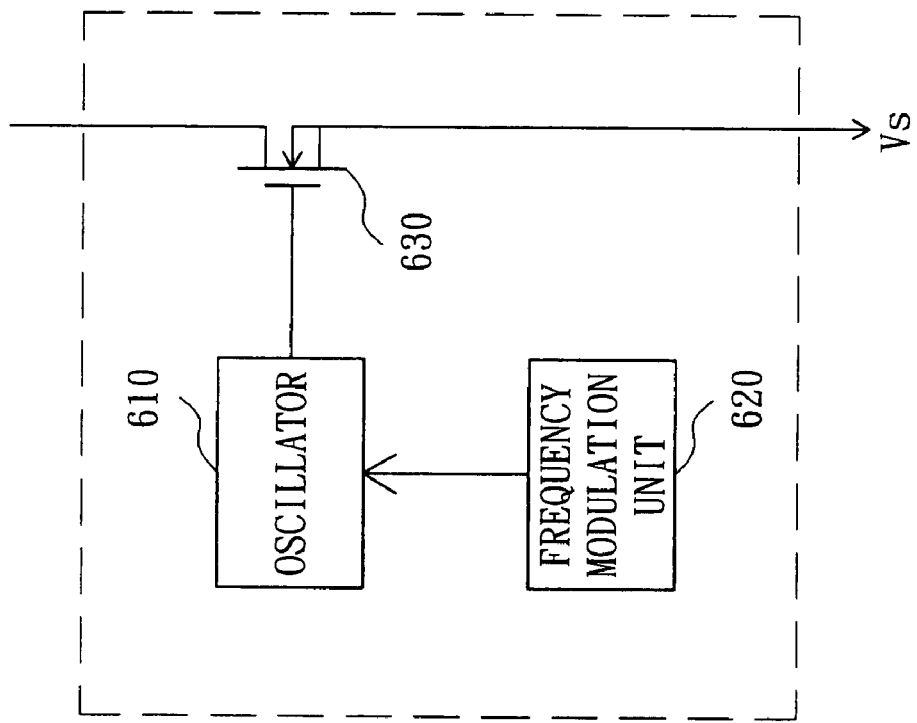
FIG. 6 is a structure diagram of a power module chip.

Referring to FIG. 6, a structure diagram of a power module chip is shown. The power module chip 217 includes a frequency modulation unit 620, an oscillator 610 and a transistor switch 630. The frequency modulation unit 620 is for modulating an oscillation frequency of the oscillator 610 and the oscillator 610 is for controlling turning on/off of the transistor switch 630. The transistor switch 630 has a source coupled to the low voltage Vs and has a drain coupled to the end of the first primary coil T11 that is the end not for receiving the second voltage V2.

In the electronic apparatus, AC/DC conversion device and power factor correction circuit thereof disclosed by the above embodiment of the invention, a spread spectrum signal is provided to the power factor correction circuit to reduce the electromagnetic interference caused by its radiation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An AC/DC conversion device, comprising:
 a power factor correction circuit receiving a first voltage, comprising:
  a switch; and
  a power control chip for receiving a spread spectrum synchronization signal,
 wherein the power control chip controls the switch by a control signal according to a variable frequency of the spread spectrum synchronization signal to output a second voltage; and
 a flyback converter for receiving the second voltage and accordingly generatinag output voltage and outputting the spread spectrum synchronization signal, the flyback converter comprising:
  a power module chip; and
  a transformer, comprising
   a first primary coil, having one end for receiving the second voltage and having the other end for receiving a second control signal of the power module chip,
   a secondary coil for generating a third voltage according to the second voltage,
   a second primary coil, having one end coupled to a low voltage, for generating a fourth voltage according to the second voltage, and
   an auxiliary coil, having one end coupled to the one end of the second primary coil which is coupled to the low voltage, for generating the spread spectrum synchronization signal according to the second voltage.

2. The device according to claim 1, wherein the power factor correction circuit further comprises:
 an inductance, having a first end and a second end, wherein the first end receives the first voltage, and the switch is coupled between the second end and the low voltage;
 a first diode, having an anode coupled to the second end of the inductance; and
 a first capacitor, having one end coupled to a cathode of the first diode for generating the second voltage and having the other end coupled to the low voltage.

3. The device according to claim 1, wherein the flyback converter further comprises:

a second diode, having an anode coupled to one end of the secondary coil, wherein the other end of the secondary coil is coupled to the low voltage; and a second capacitor, having one end coupled to a cathode of the second diode for generating an output voltage and having the other end coupled to the low voltage.

4. An AC/DC conversion device, comprising:

a power factor correction circuit, comprising:
   a switch; and
   a power control chip for receiving a spread spectrum synchronization signal, wherein the power control chip controls the switch by a control signal according to a variable frequency of the spread spectrum synchronization signal to output a second voltage; and
a flyback converter for receiving the second voltage and accordingly generating an output voltage and outputting the spread spectrum synchronization signal, the flyback converter comprising
   a power module chip; and
   a transformer, comprising
      a first primary coil, having one end for receiving the second voltage and having the other end for receiving a second control signal of the power module chip,
      a secondary coil for generating a third voltage according to the second voltage, and
      a second primary coil for generating the spread spectrum synchronization signal according to the second voltage and directly outputting the spread spectrum synchronization signal to the power control chip.

5. The device according to claim 4, wherein the power factor correction circuit further comprises:

an inductance, having a first end and a second end, wherein the first end receives a first voltage, and the switch is coupled between the second end and a low voltage;

a first diode, having an anode coupled to the second end of the inductance; and a first capacitor, having one end coupled to a cathode of the first diode for generating the second voltage and having the other end coupled to the low voltage.

6. The device according to claim 4 wherein the flyback converter further comprises:

a second diode, having an anode coupled to one end of the secondary coil, wherein the other end of the secondary coil is coupled to the low voltage; and a second capacitor, having one end coupled to a cathode of the second diode for generating an output voltage and having the other end coupled to the low voltage.

7. An electronic apparatus, comprising:

a power factor correction circuit, comprising:
   a switch, and
   a power control chip for receiving a spread spectrum synchronization signal, wherein the power control chip controls the switch by a control signal according to a variable frequency of the spread spectrum synchronization signal to output a second voltage;
a flyback converter for receiving the second voltage and accordingly generating an output voltage and outputting the spread spectrum synchronization signal; and
an electrical module, operating according to the output voltage;
the flyback converter comprising
   a power module chip; and
   a transformer, comprising
      a first primary coil, having one end for receiving the second voltage and having the other end for receiv-
      ing the second voltage and receiving a second control signal of the ower module chip,
      a secondary coil for generating a third voltage according to the second voltage, and
      a second primary coil for generating the spread spectrum synchronization signal according to the second voltage and directly outputting the spread spectrum synchronization signal to the power control chip.

8. The apparatus according to claim 7, wherein the power factor correction circuit further comprises:

an inductance, having a first end and a second end, wherein the first end receives a first voltage, and the switch is coupled between the second end and a low voltage;

a first diode, having an anode coupled to the second end of the inductance; and a first capacitor, having one end coupled to a cathode of the first diode for generating a second voltage and having the other end coupled to the low voltage.

9. The apparatus according to claim 7, wherein the flyback converter further comprises:

a second diode, having an anode coupled to one end of the secondary coil, wherein the other end of the secondary coil is coupled to the low voltage; and a second capacitor, having one end coupled to a cathode of the second diode for generating the output voltage and having the other end coupled to the low voltage.

10. The apparatus according to claim 7, wherein the electronic apparatus is a projector and the electrical module is a spatial light modulation module.

11. The apparatus according to claim 7, wherein the electronic apparatus is a liquid crystal display and the electrical module is a liquid crystal display module.

12. An AC/DC conversion device, comprising:

a power factor correction circuit receiving a first voltage, comprising:
   a switch; and
   a power control chip for receiving a spread spectrum synchronization signal, wherein the power control chip controls the switch by a control signal according to frequency of the spread spectrum synchronization signal to output a second voltage; and
a flyback converter for receiving the second voltage and accordingly generating an output voltage and outputting the spread spectrum synchronization signal, the flyback converter comprising:
   a power module chip;
   a transformer, comprising
      a first primary coil, receiving the second voltage and a second control signal of the power module chip,
      a secondary coil for generating a third voltage according to the second voltage,
      a second primary coil, coupled to a low voltage, for generating a fourth voltage according to the second voltage, and
      an auxiliary coil, coupled to the second primary coil, for generating the spread spectrum synchronization signal according to the second voltage.

13. The device according to claim 12, wherein the flyback converter further comprises:

a diode, coupled to the secondary coil and the low voltage; and a capacitor, coupled to the diode for generating an output voltage and coupled to the low voltage.

14. An electronic apparatus, comprising:

a power factor correction circuit receiving a first voltage, comprising a switch, and
a power control chip for receiving a spread spectrum synchronization signal, wherein the power control chip controls the switch by a control signal according to frequency of the spread spectrum synchronization signal to output a second voltage;
a flyback converter for receiving the second voltage and accordingly generating an output voltage and outputting the spread spectrum synchronization signal; and
an electrical module, operating according to the output voltage;
wherein the flyback converter comprises
a power module chip,
a transformer, comprising
a first primary coil, receiving the second voltage and a second control signal of the power module chip,
a secondary coil for generating a third voltage according to the second voltage,
a second primary coil, coupled to the low voltage, for generating a fourth voltage according to the second voltage, and
an auxiliary coil, coupled to the second primary coil, for generating the spread spectrum synchronization signal according to the second voltage.

15. The apparatus according to claim 14, wherein the flyback converter further comprises:
a diode, coupled to the secondary coil and the low voltage; and
a capacitor, coupled to the diode and the low voltage, for generating the output voltage.

* * * * *